United States Patent [19]
Sanders

[11] 3,891,181
[45] June 24, 1975

[54] PORTABLE VALVE ACTUATOR

[76] Inventor: Jerrell Sanders, P.O. Box 566, Hartselle, Ala. 35640

[22] Filed: Mar. 12, 1974

[21] Appl. No.: 450,297

Related U.S. Application Data
[63] Continuation-in-part of Ser. No. 294,677, Oct. 3, 1972, abandoned.

[52] U.S. Cl. ............... 251/128; 81/56; 137/368
[51] Int. Cl. ...................................... F16k 31/00
[58] Field of Search .......... 81/55, 56; 251/128, 291, 251/292; 137/637.3, 637.4, 364, 365, 368, 369

[56] References Cited
UNITED STATES PATENTS

| | | | |
|---|---|---|---|
| 729,672 | 6/1903 | Sack | 251/292 X |
| 988,504 | 4/1911 | Pride | 137/637.3 X |
| 2,491,429 | 12/1949 | Thomas | 137/637.3 |
| 3,658,086 | 4/1972 | Hart | 137/368 |
| 3,768,775 | 10/1973 | Archer | 81/56 X |

FOREIGN PATENTS OR APPLICATIONS

| | | | |
|---|---|---|---|
| 876,655 | 5/1953 | Germany | 81/55 |

Primary Examiner—Henry T. Klinksiek
Attorney, Agent, or Firm—James G. O'Boyle

[57] ABSTRACT

A portable valve actuator having coaxial shanks, the inner shank being rotatable within the outer shank, bifurcated portions being provided on corresponding ends of the shanks and handle portions on the opposite ends of the shanks, the bifurcated end of the inner shank being adapted to fit over the handle of the valve, and the bifurcated end of the outer shank being adapted to fit over the valve body, the valve being actuated by applying opposite turning forces to the shank handles.

1 Claim, 6 Drawing Figures

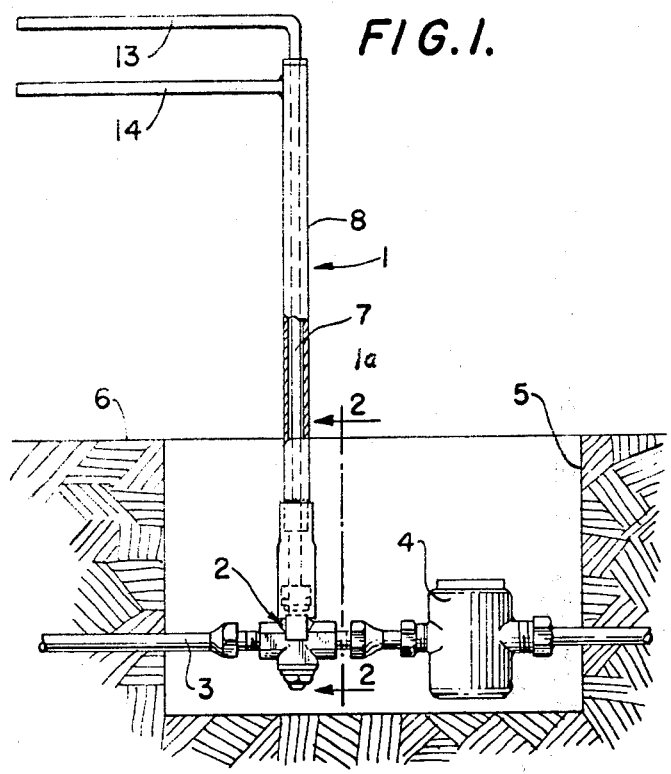
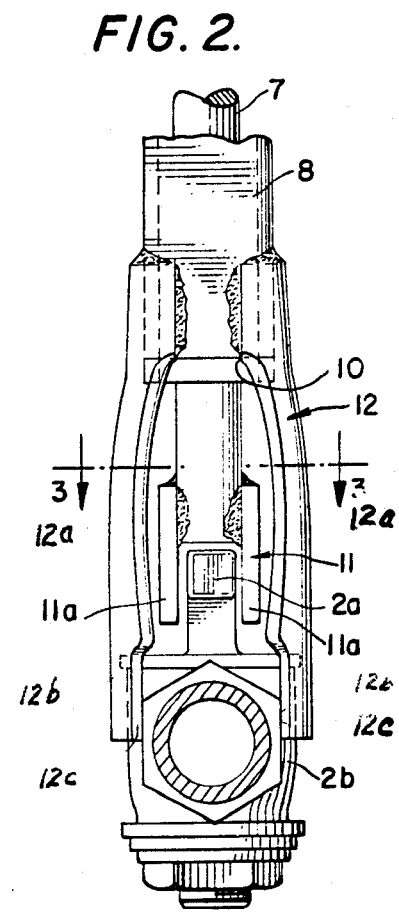
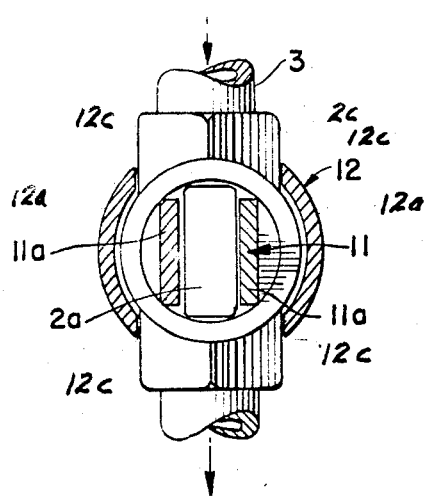
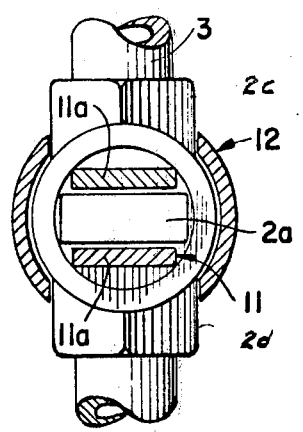
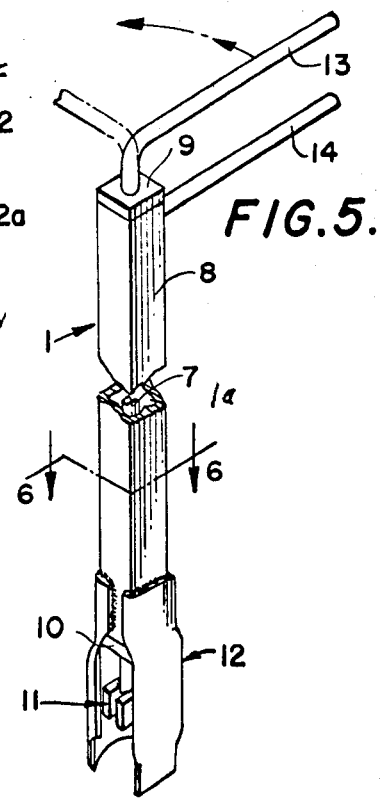
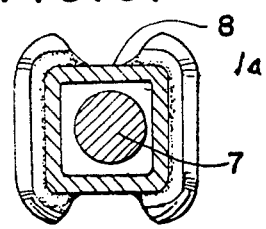

PORTABLE VALVE ACTUATOR

CROSS-REFERENCE TO RELATED APPLICATION

This application is a continuation-in-part of application Ser. No. 294,677, filed Oct. 3, 1972, now abandoned.

BACKGROUND OF THE INVENTION

Portable valve actuators have been provided for actuating curb stops which are underground plug or spherical valves connected between water service lines and water meters. At times, during the repair or maintenance of the water meter or water line, it is necessary to cut-off the supply of water by turning the curb stop to the off position. Heretofore, a T-wrench was employed to move the valve head to the off position, the T-wrench having a bifurcated end fitting over the conventional T-handle on the valve. By turning the T-wrench one-fourth of a turn, the valve T-handle is moved to a position perpendicular to the water service line which is the off position for the valve. These types of valves are characterized by the relatively strong force required to turn the valve head. In using the conventional T-wrench, the force necessary to turn the valve handle also causes the entire water meter service, including the curb stop, meter and couplings, to turn or twist thus causing the service line to bend resulting in a split, cracked or broken pipe line. This has been found particularly true in installations wherein the various components are constructed of plastic material.

After considerable research and experimentation, the tool of the present invention has been devised to overcome the disadvantages experienced when conventional T-wrenches were employed for actuating curb stops. The curb stop tool of the present invention comprises, essentially, a pair of coaxial shanks, the inner shank being rotatable within the outer shank, bifurcated portions being provided on corresponding ends of the shanks, and handle portions being provided on the opposite ends of the shanks, the bifurcated end of the inner shank being adapted to fit over the handle of the curb stop, and the bifurcated end of the outer shank being adapted to fit over the body of the curb stop, the curb stop being actuated by applying opposite turning forces to the shank handles. By this construction and arrangement, the outer shank holds the curb stop rigid, while the valve head is turned by the inner shank, thereby preventing the turning or twisting of the entire water meter service.

BRIEF DESCRIPTION OF THE DRAWINGS

FIG. 1 is a side elevational view, partly in section, showing the tool of the present invention in operative position on a curb stop;

FIG. 2 is a view taken along line 2—2 of FIG. 1;

FIG. 3 is a view taken along line 3—3 of FIG. 2, showing the curb stop in the open position;

FIG. 4 is a view similar to FIG. 3 showing the curb stop in the closed position;

FIG. 5 is a perspective view of the tool; and

FIG. 6 is a view taken along line 6—6 of FIG. 5.

Referring to the drawings and more particularly to FIG. 1 thereof, the tool 1 of the present invention is adapted to be employed for actuating a conventional curb stop 2 employed in a water meter service assembly including a service line 3, water meter 4 and associated couplings; the service being positioned in a meter box 5 disposed below ground level 6.

As will be seen in FIGS. 1, 2 and 5, the tool comprises a pair of coaxial shanks 7, 8, the inner shank 7 being rotatable within the outer shank 8 and extending through bushings 9 and 10 mounted on each end of the outer shank. The outer surface of the inner shank 7 is spaced inwardly from the inner surface of the outer shank 8, to thereby form an annular space 1a therebetween, whereby the inner shank is freely slidable longitudinally relative to the outer shank to be described more fully hereinafter.

The corresponding ends of the shanks are provided with bifurcated portions 11 and 12, adapted to fit over the curb stop valve handle 2a and valve body 2b, respectively. The bifurcated portion 11 consists of a pair of spaced, parallel plate members 11a integrally connected to the lower end of the shank 7 and adapted to straddle the conventional T-handle 2a on the curb stop. The bifurcated portion 12 consists of a pair of arcuate plates 12a having a length greater than the plate members 11a and conforming to the configuration of valve body 2b, and adapted to straddle the valve body with a close fit as shown in FIG. 2, such that arcuate portions 12b engage the opposite side walls of the valve body and the portions 12c of the longitudinally extending edges of the arcuate plates engage the inlet and outlet portions 2c, 2d.

The opposite ends of the shanks are provided with handles 13 and 14 extending perpendicular to the shanks and of a length to provide the adequate torque for turning the valve handle.

In the operation of the portable valve actuator, the inner shank 7 is first manually pulled upwardly relative to the outer shank 8 until the upper end of the bifurcation 11 abuts the face of the bushing 10. With the shanks held in this position, the bifurcation 12 is positioned around the valve body 2b. The inner shank is then released allowing its bifurcated end 11 to straddle the valve T-handle 2a, as shown in FIGS. 2 and 3. While in this position, the handles 13 and 14 will be parallel to each other as shown in FIG. 5. To close the curb stop, the operator grasps the handle 14 with one hand and handle 13 with the other hand and applies opposite forces thereto, thereby causing handle 13 to move in the direction of the arrows as shown in FIG. 5 to close the curb stop. By turning the handle 13 to a position perpendicular to handle 14, the valve head is rotated one-fourth of a turn to the closed position as shown in FIG. 4.

From the above description, it will be appreciated by those skilled in the art that the device of the present invention provides an improved portable valve actuator for curb stops which holds the curb stop valve body rigid, while the valve head is being rotated between the on and off positions, thereby preventing a turning or twisting of the valve body which could cause a breaking or rupture of the service line.

While the shanks 7 and 8 have been illustrated as a solid cylindrical rod, and as a tube having a rectangular cross-section, respectively, it will be appreciated that the shanks can be formed from shafts of various configurations, solid or tubular, and while the bifurcations 11 and 12 are shown as separate plates welded to the ends of the shanks, in tubular shank constructions the bifurcations can be formed integrally with the shank by forming a longitudinal cut in the end portion of the tubular shank and expanding the shank end portion. Furthermore, while the tool of the present invention has been shown and described for actuating curb stops, it will be appreciated by those skilled in the art that the tool can also be employed for actuating other types of valves where it is necessary to hold the valve body rigid while turning the valve handle to prevent a bending or rupture of the pipe line in which the valve is mounted.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A portable valve actuator for a conventional underground curb stop of the type having an arcuate valve body and T-handle on the valve stem wherein the valve stem is adapted to be turned without large forces being transmitted to the valve body and underground pipes connected thereto to prevent damage thereof, the actuator comprising a pair of coaxial shanks, bushings mounted on each end of the outer shank, the inner shank being rotatably mounted within said bushings, the outer surface of the inner shank being spaced inwardly from the inner surface of the outer shank to thereby form an annular space therebetween, whereby the inner shank is freely slidable therein longitudinally of the outer shank, a pair of spaced, planar parallel, plates forming a bifurcation integrally connected to one end of the inner shank and adapted to straddle the T-handle on the curb stop, a pair of spaced, arcuate plates integrally connected to the corresponding end of the outer shank and extending longitudinally thereof, said arcuate plates having a length greater than the plates on the inner shank, said arcuate plates conforming to the side wall configuration of the valve body and adapted to straddle the valve body such that the arcuate portions engage opposite side walls of the valve body, and portions of the longitudinally extending edges of the arcuate plates engage the inlet and outlet portions of the curb stop, and a handle connected to the opposite end of each shank, whereby when applying the tool to the valve to be actuated, the inner shank is pulled upwardly relative to the outer shank and the upper end of the bifurcation is held against the face of the bushing on the lower end of the outer shank, the arcuate plates are positioned around the underground valve body, the inner shank is then released allowing the bifurcated end to fall freely to thereby straddle the valve T-handle, the curb stop being actuated by applying opposite turning forces to the shank handles while the valve body is held rigid by the arcuate plates and the valve head is rotated by the planar plates.

* * * * *